US007772797B2

(12) United States Patent
Sato et al.

(10) Patent No.: US 7,772,797 B2
(45) Date of Patent: Aug. 10, 2010

(54) MOTOR CONTROLLER

(75) Inventors: Eiji Sato, Toyota (JP); Hiroki Ohtani, Aichi (JP)

(73) Assignees: Toyota Jidosha Kabushiki Kaisha, Toyota-shi (JP); Kabushiki Kaisha Toyota Chuo Kenkyusho, Aichi-gun (JP)

( * ) Notice: Subject to any disclaimer, the term of this patent is extended or adjusted under 35 U.S.C. 154(b) by 0 days.

(21) Appl. No.: 10/239,789

(22) PCT Filed: Apr. 18, 2001

(86) PCT No.: PCT/JP01/03326

§ 371 (c)(1), (2), (4) Date: Sep. 25, 2002

(87) PCT Pub. No.: WO01/80416

PCT Pub. Date: Oct. 25, 2001

(65) Prior Publication Data

US 2003/0102884 A1 Jun. 5, 2003

(30) Foreign Application Priority Data

Apr. 18, 2000 (JP) ............................. 2000-116657

(51) Int. Cl.
*H02P 27/04* (2006.01)
(52) U.S. Cl. .................. 318/801; 318/798; 318/727
(58) Field of Classification Search .................. 318/801, 318/767, 798, 727
See application file for complete search history.

(56) References Cited

U.S. PATENT DOCUMENTS

| 4,611,159 | A | * | 9/1986 | Kurakake et al. | ........... 318/803 |
|---|---|---|---|---|---|
| 4,767,976 | A | * | 8/1988 | Mutoh et al. | ................ 318/808 |
| 4,808,903 | A | * | 2/1989 | Matsui et al. | ............... 318/800 |
| 5,298,841 | A | * | 3/1994 | Katayama et al. | ........... 318/268 |
| 5,309,075 | A | * | 5/1994 | Yokoe et al. | ................ 318/608 |
| 5,341,286 | A | * | 8/1994 | Inoue et al. | ................... 363/98 |
| 5,457,375 | A | * | 10/1995 | Marcinkiewicz et al. | .... 318/802 |
| 5,461,329 | A | * | 10/1995 | Linehan et al. | ............. 324/772 |
| 5,581,452 | A | * | 12/1996 | Yamamoto | .................... 363/41 |
| 5,780,989 | A | * | 7/1998 | Matsumoto | ................. 318/632 |
| 5,798,623 | A | * | 8/1998 | El-Sadi | ....................... 318/254 |
| 5,809,438 | A | * | 9/1998 | Noro et al. | .................... 701/41 |
| 5,909,366 | A | * | 6/1999 | Sanada | ........................ 363/98 |

(Continued)

FOREIGN PATENT DOCUMENTS

EP 0 427 527 A2 5/1991

(Continued)

OTHER PUBLICATIONS

Supplemental European Search Report, Appln. No. 01921888.2-2207, dated Jul. 18, 2007.

*Primary Examiner*—Walter Benson
*Assistant Examiner*—Erick Glass
(74) *Attorney, Agent, or Firm*—Kenyon & Kenyon LLP

(57) ABSTRACT

A motor controller for correcting offset of a drive current of a motor. An offset amount calculating section (14) calculates offset amounts (Iuofs, Ivofs, Iwofs) of the drive currents (Iu, Iv, Iw) when the motor is being driven. A drive signal correcting section (18) corrects offset of the drive currents (Iu, Iv, Iw) by correcting the duty ratios of drive signals (Suo, Svo, Swo) based on the offset amounts (Iuofs, Ivofs, Iwofs).

6 Claims, 6 Drawing Sheets

U.S. PATENT DOCUMENTS

| | | | |
|---|---|---|---|
| 5,936,378 A * | 8/1999 | Iijima et al. | 318/807 |
| 5,955,860 A * | 9/1999 | Taga et al. | 318/700 |
| 6,013,994 A * | 1/2000 | Endo et al. | 318/432 |
| 6,040,673 A * | 3/2000 | Isomura et al. | 318/615 |
| 6,191,966 B1 * | 2/2001 | Yu | 363/98 |
| 6,225,774 B1 * | 5/2001 | Masaki et al. | 318/723 |
| 6,229,719 B1 * | 5/2001 | Sakai et al. | 363/37 |
| 6,259,226 B1 * | 7/2001 | Kaitani et al. | 318/798 |
| 6,281,656 B1 * | 8/2001 | Masaki et al. | 318/700 |
| 6,388,416 B1 * | 5/2002 | Nakatani et al. | 318/700 |
| 6,456,030 B1 * | 9/2002 | Masaki et al. | 318/700 |

FOREIGN PATENT DOCUMENTS

| | | |
|---|---|---|
| JP | 63-021865 | 2/1988 |
| JP | 64-30485 A | 2/1989 |
| JP | 01-270791 | 10/1989 |
| JP | 4-134196 U | 2/1992 |
| JP | 4-134197 U | 12/1992 |
| JP | 05-328733 | 12/1993 |
| JP | 6-43191 A | 2/1994 |
| JP | 6-121573 A | 4/1994 |
| JP | 06-169574 | 6/1994 |
| JP | 07-170799 | 7/1995 |
| JP | 7-170799 A | 7/1995 |
| JP | 8-119132 A | 5/1996 |
| JP | 08-149882 | 6/1996 |
| JP | 2000-023488 | 1/2000 |
| JP | 2000-78887 | 3/2000 |

* cited by examiner (a) NEGATIVE CURRENT OFFSET (b) POSITIVE CURRENT OFFSET

MOTOR CONTROLLER

TECHNICAL FIELD

The present invention relates to a device for controlling a drive current of a motor, and in particular to a device for correcting offset of a drive current of a motor.

BACKGROUND ART

Conventional controllers detect a value of a drive current of a motor using a current detector, and feed back the detected value to a drive control system. When a value detected by a current detector of such a device is offset, problems may result when a drive current of the motor which is offset to either a positive or negative side. Potential problems include generation of an eddy current due to variation of a magnetic flux inside the rotor, reduction of magnetic power of a permanent magnet due to heat generation, reduced torque due to reduced magnetic power, increased vibration and/or noise due to torque pulsation, and so forth.

As a technique to correct an offset drive current as described above, Japanese Patent Laid-open Publication No. Hei 8-149882, for example, discloses a motor controller. This controller detects as an offset amount the value of an output current using a current detector when no drive motor is supplied to the motor, in other words, when the motor is in an inoperative state, and the drive current is corrected by the offset amount.

Another conventional controller of a motor detects a rotation angle of a rotor using an angular sensor such as a resolver, and generates a drive signal based on the detected rotation angle.

In such devices, a duty ratio of a drive signal may vary due to a detection error by the angular sensor, and the drive current may thereby be offset. The offset will be described with reference to FIG. 6.

FIG. 6(a) shows an example of output characteristics of an angular sensor. In the drawing, the abscissa corresponds to an actual rotation angle •r of a rotor (hereinafter referred to as an actual rotation angle •r), while the ordinate corresponds to a rotation angle • of a rotor as detected by an angular sensor (hereinafter referred to as detected angle •). As shown, there is a period in a single rotation cycle of a rotor in which the values detected by the angular sensor contain error. In this example, the detected angle • lags behind the actual rotation angle •r=• by an error ••.

FIGS. 6(b) and 6(c) show drive signals created based on a detected angle • by an angular sensor having the output characteristics of FIG. 6(a). FIG. 6(b) relates to a drive signal having a rectangular voltage waveform (a rectangular wave in which the level is switched at •=0, •), while FIG. 6(c) relates to a drive signal having a PWM voltage waveform. In these drawings, the upper graph relates to a drive signal at a target value Sr, while the lower graph relates to an actual drive signal Su. A higher level is represented as Hi, while a lower level of represented as Lo.

Should any error be contained in a detected angle • by an angular sensor, a duty ratio of a drive signal Su, which is created based on the detected angle, is offset from a target value Sr. In the examples of FIGS. 6(b) and 6(c), because the detected angle • is behind by an error •• from an actual rotation angle •r=•, the level of a drive signal resultantly remains at a Hi-side for a longer period than at a Lo-side, which makes the drive signal offset in a positive side.

However, because the offset of a drive current due to a detection error by an angular sensor is created while the motor is rotating, the offset cannot be corrected using an offset correction value calculated when the motor is still, as in the technique disclosed in Japanese Patent Laid-open Publication No. Hei 8-149882. Therefore, reduced motor torque, increased vibration, and/or increased noise remain likely problems.

DISCLOSURE OF INVENTION

According to one aspect of the present invention, there is provided a controller for a motor, having a drive signal generator. for generating a drive signal for an inverter, and an inverter for turning on or off a switching element in accordance with the drive signal, comprising a current detecting section for detecting a current value of a drive current of the motor; an offset amount calculating section for calculating an offset amount of the drive current based on a current value detected when the motor is being driven; and a drive signal correcting section for correcting the drive signal based on the calculated offset amount.

According to the present invention, because a drive signal is corrected based on a drive current with a motor being driven, offset of a drive current which is caused with the motor being driven, such as offset of a drive signal due to an error in an angular sensor, can be more accurately corrected.

In one embodiment of the present invention, the drive signal generator may generate a drive signal as a rectangular signal, and the drive signal correcting section may correct a duty ratio of the rectangular signal based on the calculated offset amount. In a motor using a drive signal which is a rectangular signal, a drive current can be easily corrected by correcting the duty ratio of the rectangular signal.

In another embodiment of the present invention, the drive signal generator may generate a drive signal based on a voltage command value, and the drive signal correcting section may correct the voltage command value based on the calculated offset amount. In a motor, such as a motor employing PWM control, which generates a drive signal based on a voltage command value, a drive current can be easily corrected by correcting the voltage command value.

In still another embodiment of the present invention, the offset amount calculating section may calculate the offset amount based on a current value for one cycle of a drive current. This enables prompt, simple detection of an offset amount and correction of a drive current.

In yet another embodiment of the present invention, the offset amount calculating section may have a low-pass filter so that low-pass filtering is applied to the detected current value of the drive signal to thereby calculate the offset amount. This enables detection of an offset amount using a simple structure.

BEST MODE FOR CARRYING OUT THE INVENTION

Figure 1:
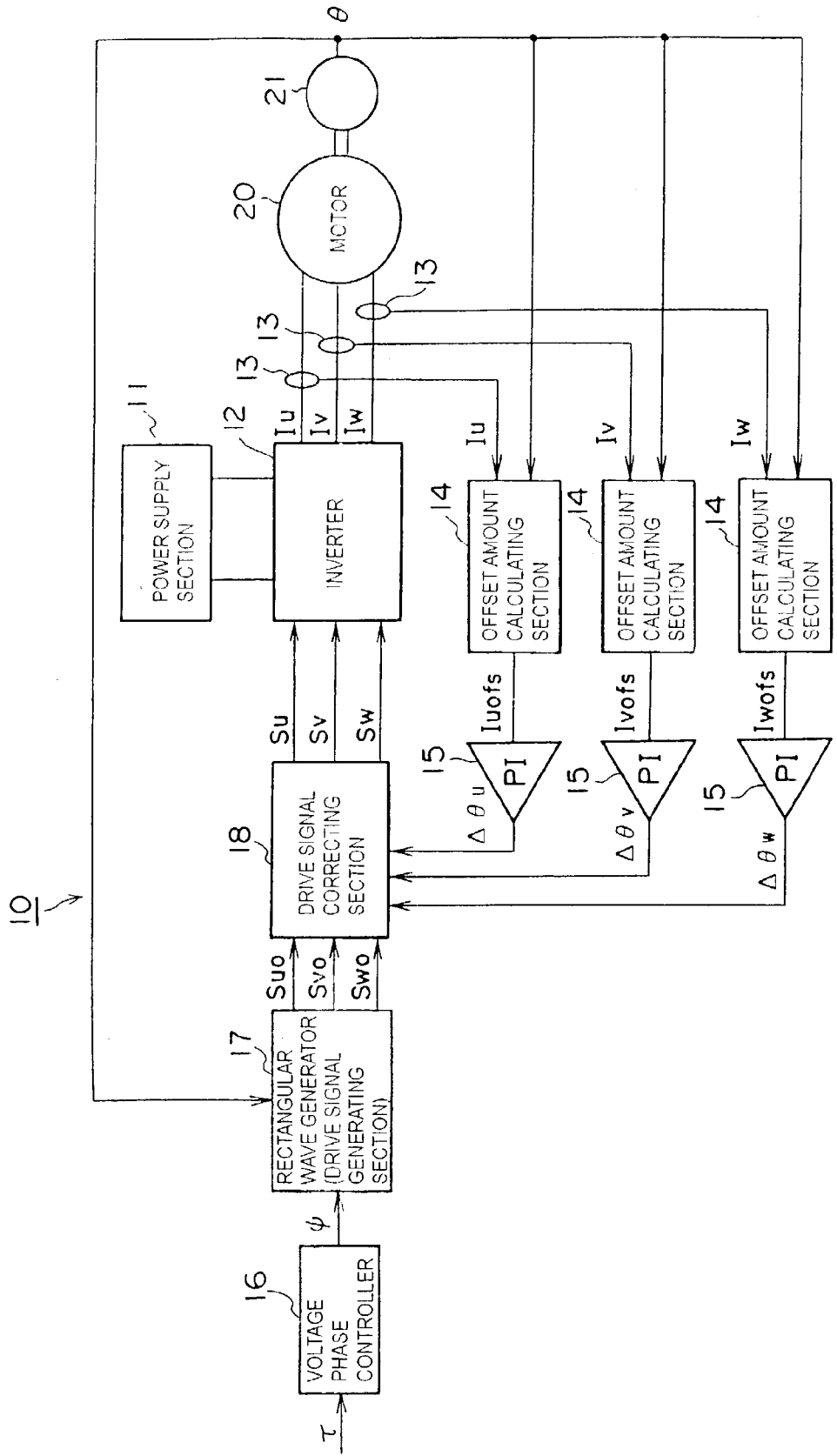
FIG. 1 is a schematic diagram showing a structure of a controller of a motor according to a first embodiment of the present invention.
Figure 2:
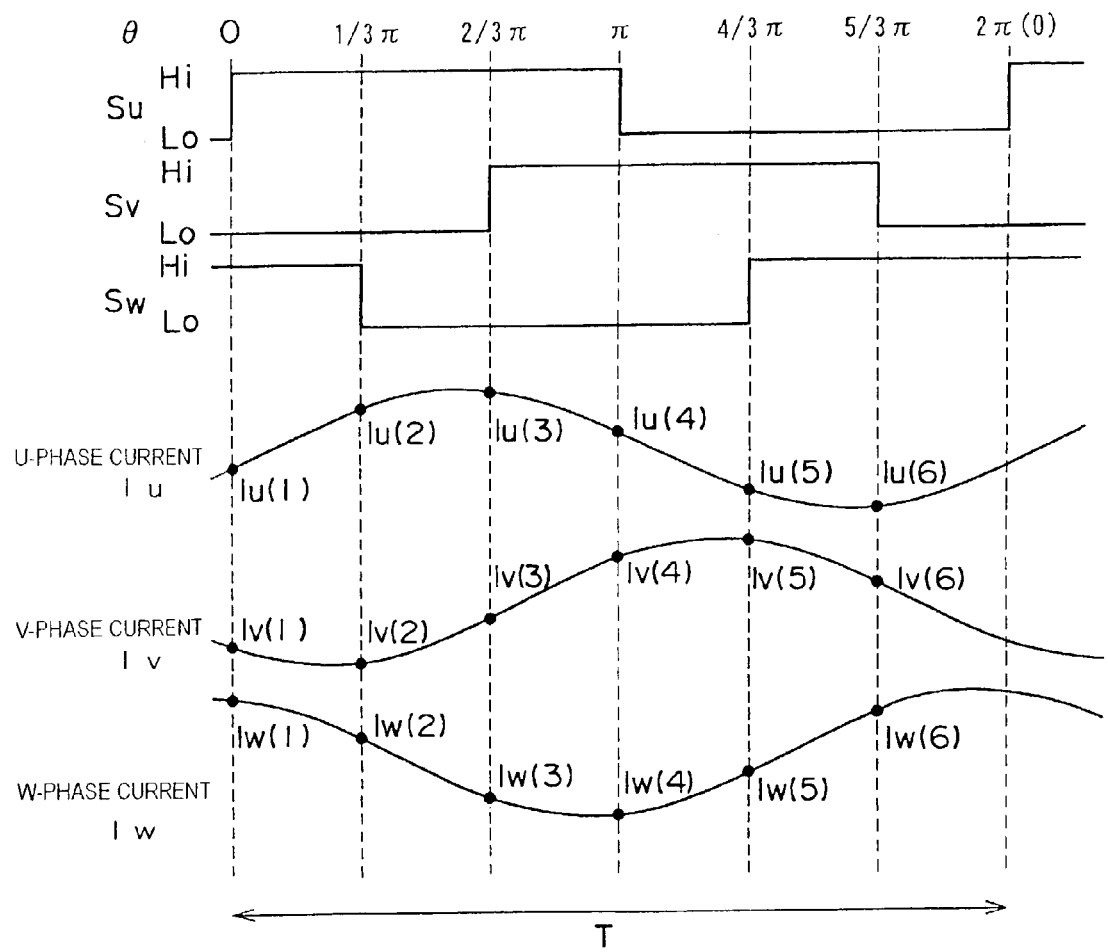
FIG. 2 is a diagram explaining calculation of an offset amount with the controller of the motor according to the first embodiment of the present invention.
Figure 3:
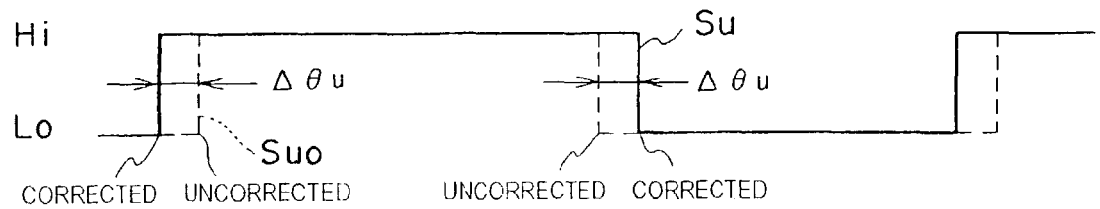
FIG. 3 is a diagram explaining correction of a drive signal in the controller of the motor according to the first embodiment of the present invention.
Figure 3:
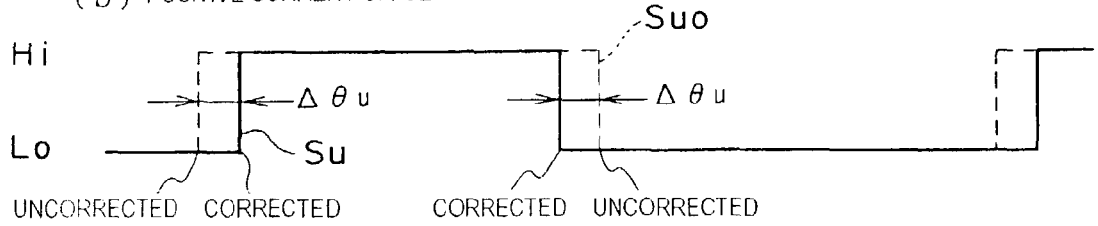

In the following, a controller of a motor according to a first embodiment of the present invention will be described with reference to the accompanied drawings. FIG. 1 is a diagram showing a structure of a controller in this embodiment. FIG. 2 shows waveforms of drive signals for the respective phases of a motor and of drive currents. FIG. 3 is a drawing explaining correction of a drive signal according to this embodiment.

In this embodiment, a motor 20 may be a multi-phase, for example, three-phase, AC motor, driven by a drive current supplied from a current supplier 12, for example, an inverter, to each phase (U phase, V phase, W phase) of the motor 20. The current supplier 12, for example, an inverter, generates a drive current to be supplied to the motor 20 by converting a current from a power supply section 11 to a multi-phase AC based on drive signals for the respective phases (Su, Sv, Sw). The controller 10 in this embodiment generates a drive signal having a rectangular voltage waveform in which voltage levels are switched based on a rotation angle of the rotor which is detected by an angular sensor 21, for example, a resolver, (hereinafter referred to as a detected angle).

The controller 10 of a motor comprises a power supply section 11, an inverter 12, a drive current detector 13, an offset amount calculating section 14, a correction amount calculator 15, a voltage phase controller 16, a drive signal generating section 17, and a drive signal correcting section 18.

The voltage phase controller 16 receives a torque command value • from an external controller, and determines a voltage phase • for each of the respective phases based on the received value. Based on the voltage phase • and a detected angle •, the drive signal generating section 17, for example, a rectangular wave generator, generates drive signals for the respective phases (Suo, Svo, Swo), each having a rectangular voltage waveform. The drive signal correcting section 18 corrects these drive signals (Suo, Svo, Swo) into drive signals (Su, Sv, Sw). The correction will be described later.

The drive current detectors 13 detect values of drive currents for the respective phases (Iu, Iv, Iw) to be supplied from the current supplier 12 to the motor 20. Based on the values of drive currents for the respective phases (Iu, Iv, Iw), which are detected by the drive current detectors 13 with the motor being driven, and the detected angle •, the offset amount calculating section 14 calculates offset amounts of the drive currents (Iu, Iv, Iw), for example by averaging the values of the drive currents (Iu, Iv, Iw) in one cycle.

FIG. 2 shows an example of calculation of an offset amount. FIG. 2 shows, from the top of the figure, a detected angle •, drive signals for the respective phases (from top downward, drive current command values for U phase, V phase, W phase (Su, Sv, Sw)), and values of drive currents for the respective phases (Iu, Iv, Iw). In this embodiment, values of drive currents for the respective phases (Iu, Iv, Iw) are sampled over a single rotation cycle T of a motor at timing determined by equally dividing a single rotation cycle T, and averaged so that the averaged value is determined as an offset value. That is, where offset amounts of the respective drive currents (Iu, Iv, Iw) are denoted as Iuofs, Ivofs, Iwofs, respectively, $$Iuofs = (Iu(1) + Iu(2) + \cdots + Iu(n))/n$$

$$Ivofs = (Iv(1) + Iv(2) + \cdots + Iv(n))/n$$

$$Iwofs = (Iw(1) + Iw(2) + \cdots + Iw(n))/n$$

are obtained, wherein n is the number of equidistant divisions of a single rotation cycle T. In the example of FIG. 2, an offset value is calculated by calculating an average of drive current values sampled at a timing determined by equally dividing a single rotation cycle T, that is, a detected angle •=0 to 2•, into six equal sections for every detected angle •=⅓•.

In this embodiment, a drive signal is corrected by correcting its phase, as described below. Specifically, based on the offset amounts (Iuofs, Ivofs, Iwofs) calculated by the offset amount calculating section 14, the correction amount calculator 15 calculates amounts to correct the drive signals for the respective phases as phase correction amounts (••u, ••v, ••w). The correction amount calculator 15 may comprise a PI calculator, for example, and calculates phase correction amounts for the respective phases (••u, ••v, ••w) as follows:

$$\bullet\bullet u = Ksp \bullet Iuofs + Ksi \bullet\bullet Iuofs \bullet dt$$

$$\bullet\bullet v = Ksp \bullet Ivofs + Ksi \bullet\bullet Ivofs \bullet dt$$

$$\bullet\bullet w = Ksp \bullet Iwofs + Ksi \bullet\bullet Iwofs \bullet dt$$

wherein Ksp is a proportional gain and Ksi is an integral gain. A proportional gain Ksp and an integral gain Ksi are determined in advance for each controller, and may be stored in advance in, for example, a memory, not shown.

Based on the correction amounts (••u, ••v, ••w) calculated by the correction amount calculator 15, the drive signal correcting section 18 corrects relevant drive signals (Suo, Svo, Swo). Specifically, in this embodiment, duty ratios of the drive signals (Suo, Svo, Swo), each having a rectangular waveform and output from the drive signal generating section 17, are corrected by correcting their phases, as described above.

FIG. 3 shows one example of this correction. In the drawing, the dotted line represents a waveform of a U-phase drive signal Suo before correction, while the solid line represents that after correction.

When the calculated offset amount Iuof for the U-phase drive current is negative, the duty ratio is corrected to have a larger value, as shown in FIG. 3(*a*). Specifically, the rectangular waveform of a drive signal Suo is corrected by shifting the rising and falling of the waveform each by a correction amount ••u, which is calculated by the correction amount calculator 15, such that the interval between these is widened. A larger duty ratio leads to a higher drive current, that is, a drive current shifted towards the positive side. As a result, the offset is corrected.

When the calculated offset amount Iuof is positive, on the other side, the duty ratio is corrected to have a smaller value, as shown in FIG. 3(*b*). Specifically, the rectangular waveform of a drive signal Suo is corrected by shifting the rising and falling of the waveform each by a correction amount ••u, which is calculated by the correction amount calculator 15, such that the interval between these is narrowed. A smaller duty ratio leads to a lower drive current, that is, a drive current shifted toward the negative side. As a result, the offset is corrected.

As described above, correcting a phase of a drive signal Suo to thereby correct its duty ratio enables easy and accurate correction of offset of a drive current. This correction can be similarly applicable to other phases.

Figure 4:
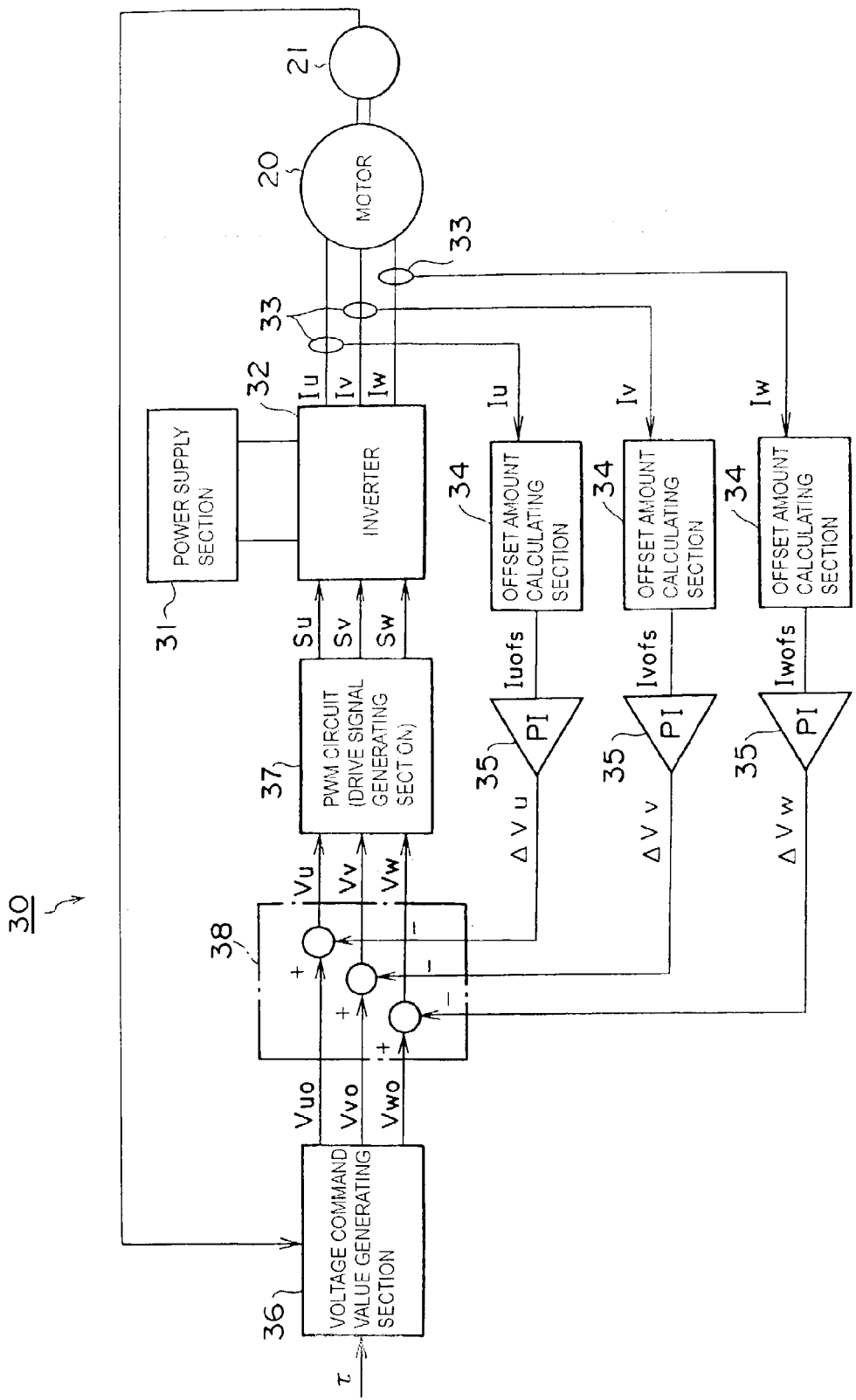
FIG. 4 is a schematic diagram showing a structure of a controller of a motor according to a second embodiment of the present invention.
Figure 5:
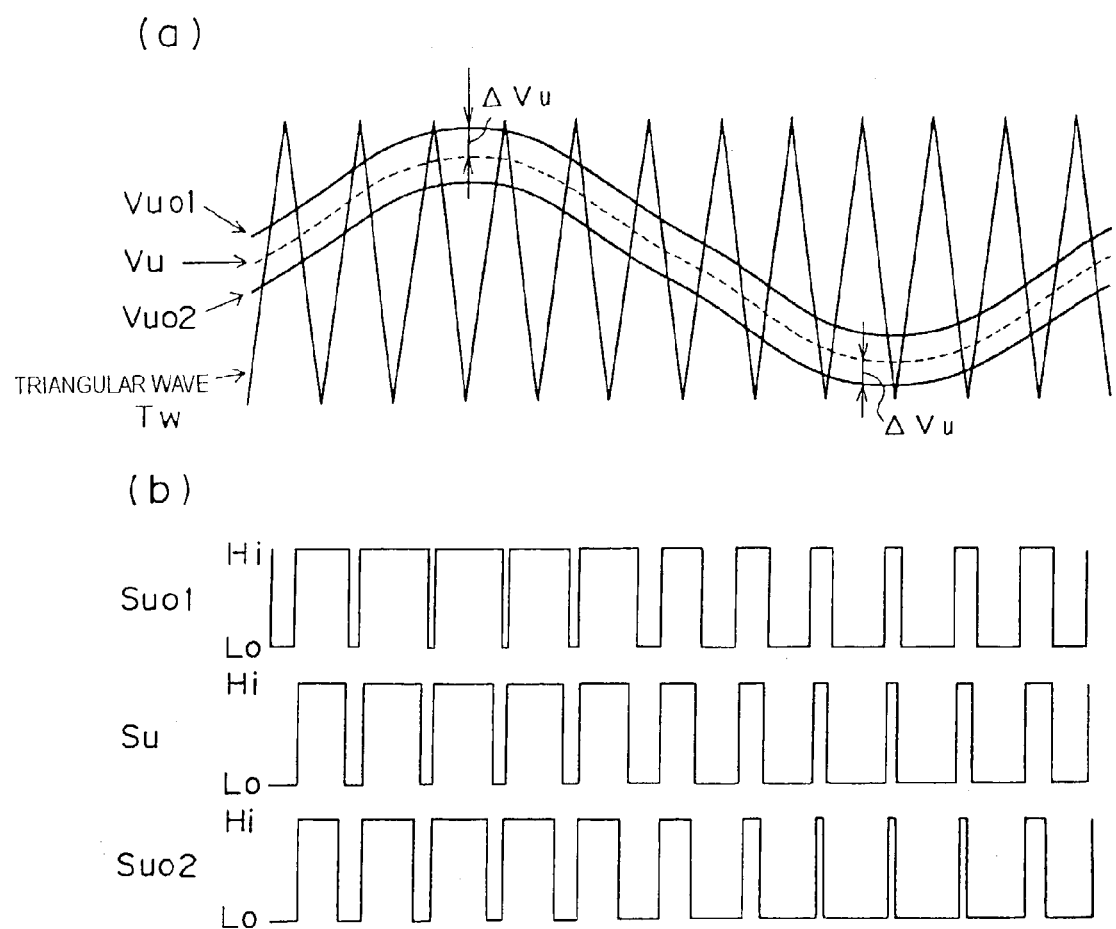
FIG. 5 is a diagram explaining creation and correction of a voltage command value according to the second embodiment of the present invention.
Figure 6:
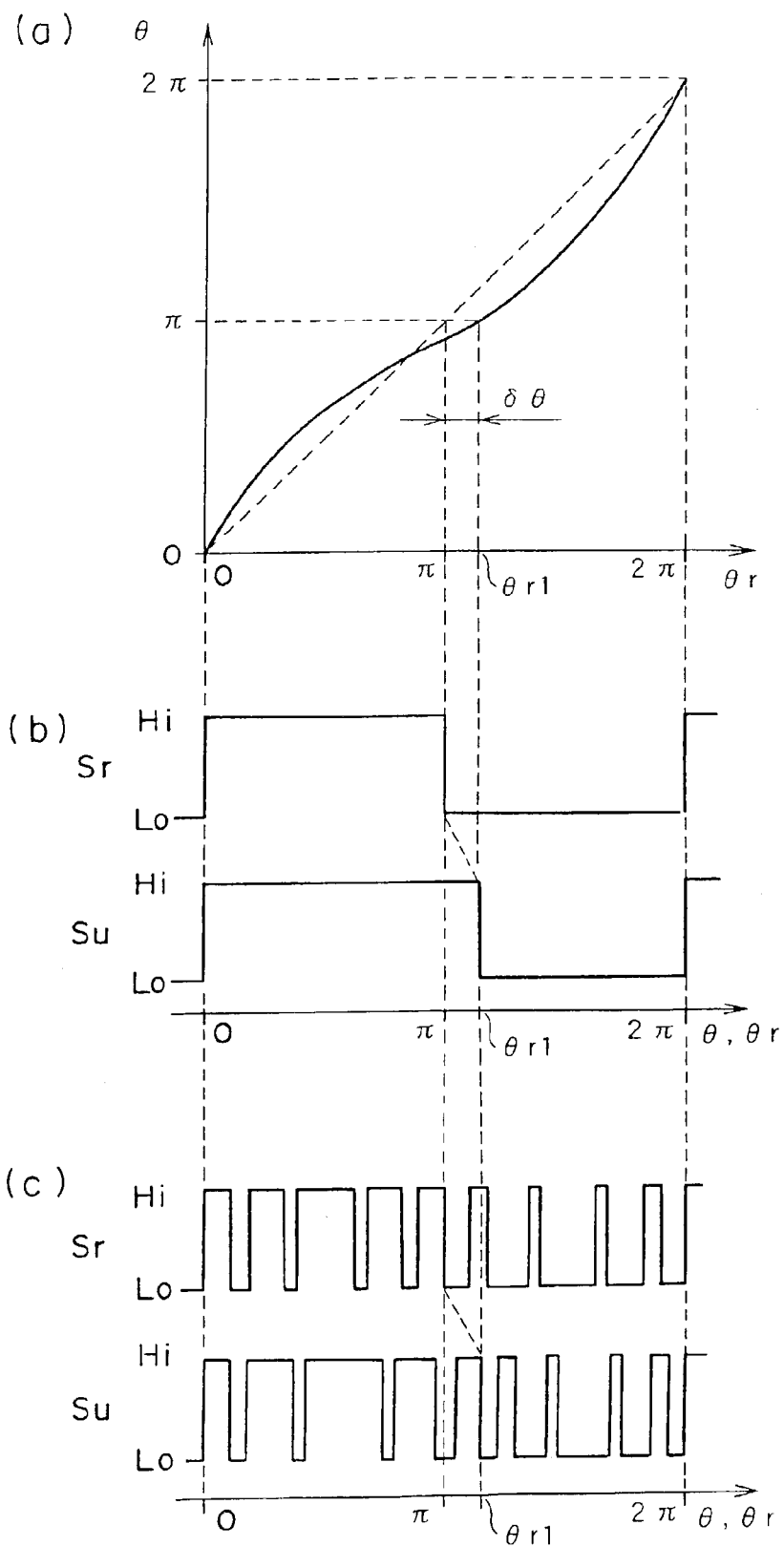
FIG. 6 is a diagram explaining an error in a detected angle by an angular sensor relative to an actual rotor rotation angle, and a deviation in a duty ratio with respect to a drive signal created based on the detected angle.

Next, a controller of a motor according to a second embodiment of the present invention will be described with reference to the accompanied drawings. FIG. 4 is a diagram showing a structure of a controller in this embodiment. FIG. 5 is a diagram explaining correction of a drive signal in this embodiment.

In this embodiment, a motor 20 is a multi-phase, for example, three-phase, AC motor, and driven by a drive current supplied from a current supplier 32, for example, an inverter, to each phase (U phase, V phase, W phase) of a motor 20. The current supplier 32, for example, an inverter, generates a drive current to be supplied to the motor 20 by converting a current from a power supply section 31 to a multi-phase AC based on the drive signals for the respective phases (Su, Sv, Sw). The controller in this embodiment generates a drive signal having a PWM voltage waveform based on a rotation angle • of a rotor which is detected by an angular sensor 21 (a detected angle).

The controller 30 of a motor comprises a power supply section 31, a current supplier 32, a drive current detector 33, an offset amount calculating section 34, a correction amount calculator 35, a voltage command value generating section 36, a drive signal generating section 37, and a drive signal correcting section 38.

The voltage command value generating section 36 receives a torque command value • from an external controller, and accordingly generates voltage command values (Vuo, Vvo, Vwo), based on which drive signals (Su, Sv, Sw) are generated. The drive signal correcting section 38 corrects the voltage command values (Vuo, Vvo, Vwo) and outputs voltage command values (Vu, Vv, Vw). Subsequently, the drive signal generating section 37, for example, a PWM circuit, generates drive signals for the respective phases (Su, Sv, Sw) having PWM voltage waveforms based on the voltage command values (Vu, Vv, Vw) produced by the drive signal correcting section 38. Correction into the voltage command values (Vu, Vv, Vw) and generation of the drive signals (Su, Sv, Sw) by a PWM circuit will be described later.

The drive current detectors 33 detect values of drive currents for the respective phases (Iu, Iv, Iw) to be supplied from the current supplier 32 to the motor 20. Based on the values of drive currents for the respective phases (Iu, Iv, Iw), which are detected by the drive current detectors 33 with the motor being driven, the offset amount calculating section 34 calculates offset amounts of the drive currents (Iu, Iv, Iw).

In this embodiment, the current amount calculating section 34 has, for example, a low-pass filter, and outputs offset amounts (Iuofs, Ivofs, Iwofs) of the respective drive currents (Iu, Iv, Iw). Employment of a low-pass filter having a lower filtering frequency enables output of an average. This arrangement enables easy calculation of offset amounts (Iuofs, Ivofs, Iwofs) without utilizing a phase of a detected angle •.

Based on the offset amounts calculated by the current amount calculating section 34, the correction amount calculator 35 calculates correction amounts for the voltage command values for respective phases (Vuo, Vvo, Vwo). Further, based on the calculated correction amounts, the drive signal correcting section 38 corrects the voltage command values (Vuo, Vvo, Vwo). In this embodiment, this correction is made by correcting the levels of the voltage command values (Vuo, Vvo, Vwo), based on which drive signals (Su, Sv, Sw) are generated.

FIG. 5(a) shows voltage command values (Vu, Vuo1, Vuo2) and a triangular wave TW in the drive signal generating section 37, for example, a PWM circuit. FIG. 5(b) shows drive signals (Su, Suo1, Suo2) which are generated based on these voltage command values (Vu, Vuo1, Vuo2) and the triangular wave Tw. Specifically, the drive signal generating section 37 comprises a comparator to compare the voltage command values (Vu, Vv, Vw) and the triangular wave Tw so that drive signals (Su, Sv, Sw) are generated based on the comparison result. Specifically, the drive signal generating section 37 generates drive signals (Su, Sv, Sw) having a rectangular voltage waveform which is at a high voltage value Hi when the voltage command value (Vu, Vv, Vw) is larger than the triangular wave Tw and at a low voltage value Lo when the voltage command value (Vu, Vv, Vw) is smaller than the triangular wave Tw. Similarly, drive signals Suo1, Suo2 are generated with respect to the voltage command values Vuo1, Vuo2, respectively.

As described above, the correction amount calculator 35 calculates correction amounts for the voltage command values for the respective phases based on the offset amounts calculated by the offset amount calculating section 34. That is, where the correction to voltage command values is made by correcting voltage values of the voltage command values in this embodiment, as described above, the correction amount calculator 35 calculates voltage correction amounts (•Vu, •Vv, •Vw). For example, the correction amount calculator 35 may comprise a PI calculator, and may calculate voltage correction amounts for the respective phases (•Vu, •Vv, •Vw) as follows:

$$•Vu = Kvp•Iuofs + Kvi ••Iuofs•dt$$

$$•vu = Kvp•Ivofs + Kvi ••Ivofs•dt$$

$$•Vw = Kvp•Iwofs + Kvi ••Iwofs•dt$$

wherein Kvp is a proportional gain and Kvi is an integral gain, A proportional gain Ksp and an integral gain Ksi are determined in advance for each controller, and may be stored in advance in, for example, a memory, not shown.

Further, as described above, the drive signal correcting section 38 corrects the voltage command values (Vuo, Vvo, Vwo) into voltage command values (Vu, Vv, Vw) based on the correction amounts (•vu, •Vv, •Vw) calculated by the correction amount calculator 35. In this correction, when the calculated offset amounts of the drive currents (Iu, Iv, Iw) are positive, for example, when an offset amount Iuofs of a U phase drive current calculated based on the U-phase voltage command value Vuo1 is positive as shown in FIG. 5(a), the voltage command value Vuo1 is corrected to a voltage command value Vu, the level of which is lower than that of the value Vuo1 by the offset amount• Vu. With this correction, from the drive signal Suo results a corrected drive signal Su having a lower duty ratio, as shown in FIG. 5(b). A smaller duty ratio leads to a lower drive current, that is, a drive current shifted to a negative side. As a result, the offset is corrected.

When offset amounts of the calculated drive currents (Iuofs, Ivofs, Iwofs) are negative, on the other hand, for example, when the offset amount Iuofs of a U phase drive current for Iuofs calculated based on the U-phase voltage command value Vuo2 is negative as shown in FIG. 5(a), the voltage command value Vuo2 is corrected to a voltage command value Vu, the level of which is higher than that of the value Vuo2 by the offset amount • Vu. With this correction, from the drive signal Suo results a corrected drive signal Su having a higher duty ratio, as shown in FIG. 5(b). A larger duty ratio leads to a higher drive current, that is, a drive current shifted toward a positive side. As a result, the offset is corrected.

As described above, correcting a voltage command value (Vu, Vv, Vw) enables easy and accurate correction of offset of a drive current.

INDUSTRIAL APPLICABILITY

As described above, according to the present invention, by correcting a drive current based on the drive current the motor being driven, offset of a drive current which is caused with the motor being driven can be corrected. This can further suppress drop of motor torque and/or increase of vibration and/or noise.

The invention claimed is:

1. A controller for a motor, having a drive signal generator for generating a drive signal for an inverter, the inverter for turning on or off a switching element in accordance with the drive signal, comprising:
   a current detecting section for detecting a current value of a drive current of the motor;
   an offset amount calculating section for calculating an offset amount in terms of a real direct current amount of the drive current based on a plurality of equidistant samples of the current value detected within a full rotation cycle of a rotor of 0 to $2\pi$ radians when the motor is being driven, the drive current including positive and negative peak values that are asymmetrical about a zero level, and the samples including non-peak values, wherein the offset amount is an average value in one cycle of the drive current that has a positive peak and a negative peak about the zero level; and
   a drive signal correcting section for correcting the drive signal based on the calculated real direct current amount.

2. The controller for a motor according to claim 1, wherein
   the drive signal generator generates the drive signal as a rectangular signal of one pulse during the rotation cycle, and
   the drive signal correcting section corrects a duty ratio of the rectangular signal based on the calculated real direct current amount.

3. The controller for a motor according to claim 1, wherein
   the drive signal generator generates the drive signal based on a voltage command value, and
   the drive signal correcting section corrects the voltage command value based on the calculated real direct current amount.

4. The controller for a motor according to claim 1, wherein the offset amount calculating section calculates the real direct current amount based on the current value for a single cycle of the drive current.

5. The controller for a motor according to claim 1, wherein the offset amount calculating section has a low-pass filter so that low-pass filtering is applied to the detected current value of the drive signal to thereby calculate the real direct current amount.

6. A controller for a multi-phase motor, comprising;
   a current detecting section to detect a current value of a drive current for respective phases of the motor;
   an offset amount calculating section coupled to the current detecting section to calculate an offset amount of the drive current for each of the respective phases, based on a plurality of equidistant samples of the current value detected within a full rotation cycle of a rotor of 0 to $2\pi$ radians when the motor is being driven, the drive current including positive and negative peak values that are asymmetrical about a zero level, and the samples including non-peak values, wherein the offset amount is an average value in one cycle of the drive current that has a positive peak and a negative peak about the zero level;
   a drive signal generating section to generate a rectangular voltage waveform for each of the respective phases; and
   a drive signal correcting section coupled to the offset amount calculating section and to the drive signal generating section, to correct the rectangular voltage waveform for each of the respective phases by the corresponding respective offset amount, the corrected rectangular voltage waveform for each of the respective phases forming drive signals for the multi-phase motor.

* * * * *

UNITED STATES PATENT AND TRADEMARK OFFICE
CERTIFICATE OF CORRECTION

PATENT NO. : 7,772,797 B2  Page 1 of 1
APPLICATION NO. : 10/239789
DATED : September 25, 2002
INVENTOR(S) : Eiji Sato et al.

It is certified that error appears in the above-identified patent and that said Letters Patent is hereby corrected as shown below:

| Column | Line | |
|---|---|---|
| 1 | 56 | Change "level of" to --level is--. |
| 6 | 34 | Change "·$vu$=…" to --·$Vv$=…--. |
| 6 | 45 | Change "· vu," to --· Vu,--. |

Signed and Sealed this

Sixteenth Day of November, 2010

David J. Kappos
*Director of the United States Patent and Trademark Office*